United States Patent [19]

Jüngmann

[11] 3,930,594

[45] Jan. 6, 1976

[54] PIVOT HINGE FOR AN APPARATUS COVER HOOD

[75] Inventor: Manfred Jüngmann, St. Georgen, Germany

[73] Assignee: Dual Gebrüder Steidinger, St. Georgen, Schwarzwald, Germany

[22] Filed: Apr. 29, 1975

[21] Appl. No.: 572,907

[30] Foreign Application Priority Data

May 13, 1974 Germany............................ 2423007

[52] U.S. Cl. ............................................... 220/335
[51] Int. Cl.² .......................................... B65D 41/08
[58] Field of Search................... 220/335, 343, 334; 248/134, 147; 15/257.075

[56] References Cited
UNITED STATES PATENTS

| | | | |
|---|---|---|---|
| 3,548,446 | 12/1970 | Hocq .............................. | 220/335 X |
| 3,888,386 | 6/1975 | Svensson........................... | 220/335 |

*Primary Examiner*—George T. Hall
*Attorney, Agent, or Firm*—Martin A. Farber

[57] ABSTRACT

A pivot hinge for an apparatus cover hood comprising sleeves concentric to the pivot axis and axially displaceably yet non-rotatably arranged relative to the housing bottom part on the latter, and the face sides of the sleeves, respectively, being formed with curved courses. A cam is pivotally mounted about the pivot axis and with respect to the cover hood rotates therewith. Compression springs press the axially displaceable sleeves, respectively, with their curved courses against the cam, whereby the inclination of the curved courses relative to the radial plane of the sleeves and the measure or adjustment of the compression springs being selected such that within a predetermined rotation range of the cam about the axis, which corresponds substantially to the opening movement of the cover hood, there is produced a rotational moment with respect to the axis which corresponds in every position within the rotation range substantially to the rotational moment which is produced by the cover hood as a consequence of its gravity force, yet in an opposite rotational sense.

4 Claims, 3 Drawing Figures

PIVOT HINGE FOR AN APPARATUS COVER HOOD

The present invention relates to a pivot hinge for an apparatus cover hood.

With devices which are coverable by a hood, such as for example, record players or turntables, it is desired in many cases to be able to allow the cover hood to stay in different open positions. Various devices are known which serve this purpose, such as for example cover supports which assume the weight of the cover hood by means of catches, notches or friction means. It is further known to equip the hinge of the cover itself therefor with corresponding friction means in order to avoid additional space and visible construction means (German Auslegeschrift DAS 1 023 901, Gebrauchsmuster Gbm 7 325 669). Such devices have the disadvantage that force is required for the actuation and the cover hood frequently does not close unobjectionably, since during the closing it is somewhat springs back. Pivot hinges with spring means for producing of a counter rotation moment more or less avoid this disadvantage. By one commonly known embodiment a helical spring is used for this purpose which lies with its longitudinal axis in the axis of rotation of the hinge and becomes loaded upon twisting. With such an arrangement, a cover can be raised automatically by itself by corresponding overcompensation or its raising is easier by undercompensation. A cover to be allowed to remain open in any open position, that is in every position an exact equilibrium or balanced condition to be produced, is not possible, since with a turning spring only a continuously increasing and decreasing moment, respectively, is attainable, which has yet a sinusoidally shaped course produced by the weight of the cover. It is further known to achieve a determined rotational moment course by a certain arrangement of a tension spring to a lever. An exact compensation, however thus, as a consequence is not possible, aside from the fact that such an arrangement requires comparatively plenty of room and is expensive. By using a counterweight indeed an exact compensation moment is attainable. It requires however so much space that in most cases it can not be used.

The present invention is based on the task and object to produce a hinge connection which by itself, that is, without overhanging, projecting or nonloading construction parts, makes it possible to achieve a compensation moment exactly corresponding to the weight of the cover- or cover- hood in every position, such that it stands still by itself in every position. Accordingly starting out from a pivot hinge for a cover hood onto a bottom part of an apparatus housing with spring means for producing of a rotational moment which acts against the rotational moment produced by the weight of the cover hood, the present invention provides as another object thereof, sleeves concentric to the pivot axis and axially displaceably yet non-rotatably arranged relative to the housing bottom part on the latter, and the face sides of the sleeves, respectively, being formed with curved courses. A cam is pivotally mounted about the pivot axis and with respect to the cover hood rotates therewith. Compression springs press the axially displaceable sleeves, respectively, with their curved courses against the cam, whereby the inclination of the curved courses relative to the radial plane of the sleeves and the measure or adjustment of the compression springs being selected such that within a predetermined rotation range of the cam about the axis, which corresponds substantially to the opening movement of the cover hood, there is produced a rotational moment with respect to the axis which corresponds in every position within the rotation range substantially to the rotational moment which is produced by the cover hood as a consequence of its gravity force, yet in an opposite rotational sense.

Weight compensated covers or cover hoods are strongly loaded or stressed in the range of the hinge by the hinge itself during application of the compensation moment, notwithstanding the type of compensation. Consequently there exists, particularly with use of synthetic materials, the danger of a plastic deformation for the cover or the cover hood, which in customary manner is acted against by the most possibly highly loading hinge parts.

A further task and object of the present invention resides in the reduction of the loading or with like loading to do without highly loading parts. From this one proceeds from the realization that in many cases of use, the cover or the cover hood is opened only a relatively short time in proportion to the duration of the closed condition, for example, only in order to perform a service operation and that many materials, preferably synthetic materials, with comparatively short time loading endure a far higher loading than with a continuous stressing or loading.

As a further development of the invention it is an object to provide as a solution to this task, a face sided curved course on the sleeves which, in the range of the cam position which corresponds to the closing position of the cover hood, turns into a radial plane to the pivot axis.

With the here concerned hinge connection, it is already as a rule not possible with regard to the different demands on the material to produce the cover or cover hood and pivot hinge of one piece. The connection possibilities between both parts, particularly with use of synthetic materials, are limited according to their type and moreover difficult to produce. The therefor known screw- and rivet- connections require large dimensions because of their high loading, which makes the form configuration worse or heavier and limited, respectively. Moreover the pivot parts usually require an overhanging or projecting attachment.

A cover hood is known which is set on a bottom part of a housing, with which hood the rear vertical standing back wall of the hood is lengthened toward the bottom and is insertable in a rear section recesses of the bottom part of the housing (German Auslegeschrift DBP 1 202 523). During opening of the cover hood, the extension of the rear hood wall forms the abutment for the cover. An actual hinge connection thereby is not provided.

A further task and object of the invention resides in producing a hinge arrangement which contains no visible parts or no parts projecting from the housing and the cover hood, respectively, and in accordance with production, an easily producable connection, which is favorable with respect to material loading, is made possible between the pivot hinge and the cover hood.

In accordance with the above, it is still another object of the present invention to provide the holding part, which is twistable or rotatable about the pivot axis and supported on the bottom part of the apparatus housing, carrying the above-mentioned cam, and having a slot shaped opening accessible from one side, and an extension of the cover hood which is directed substantially perpendicularly toward the bottom, applied on its bottom side and insertable in the above-mentioned slot shaped opening on the holding part.

With the above and other objects in view, the present invention will become more readily understood in connection with the following detailed description of a preferred embodiment of the invention with reference to the accompanying drawings, of which:

Figure 1:
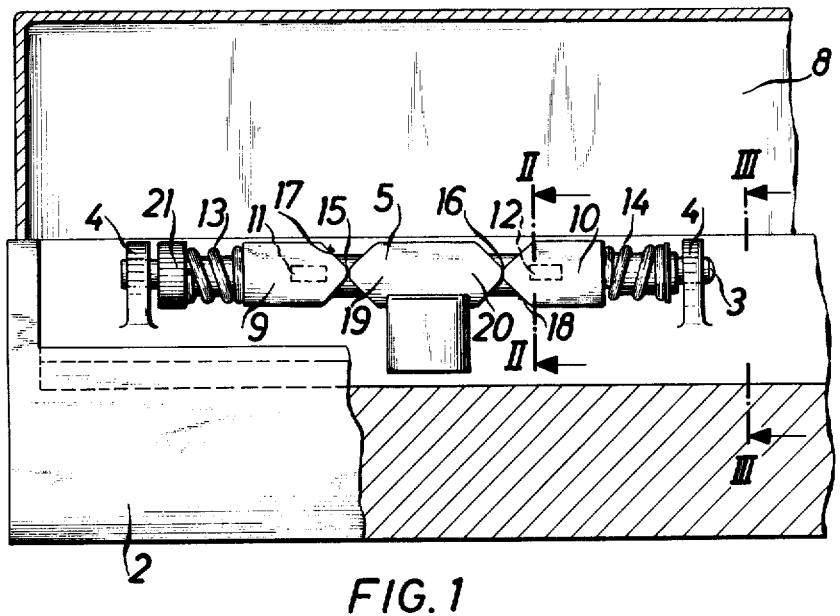
FIG. 1 is a rear view of a housing with transparent cover hood, partly broken away.
Figure 2:
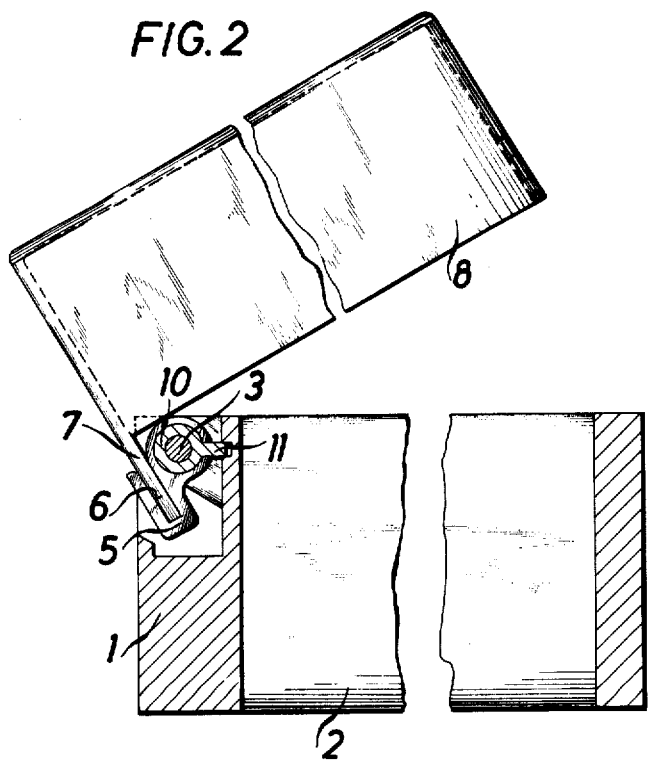
FIG. 2 is a cross-section taken along the lines 11—11 of FIG. 1 through the bottom part of the housing with the cover hood in the range of the pivot hinge.
Figure 3:
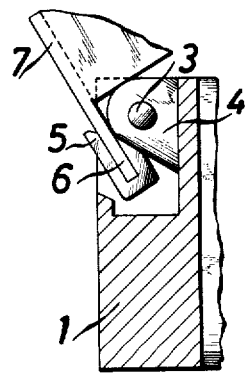
FIG. 3 is section parallel thereto taken along the lines 111—111 of FIG. 1.

Referring now to FIGS. 1-3 of the drawing, a pivot hinge for an apparatus cover hood, comprises a pivot axle 3 supported in two bearing blocks 4 in a rear wall 1 of a bottom part 2 of an apparatus housing. A holding part 5 is pivotally mounted on the pivot axle 3, which holding part 5 contains a recess 6 in which the extended rear wall 7 of the cover hood 8 is insertable.

The insertion of the rear wall of the hood in a recess is such a simple process that it can even be handled by a layman, which makes possible a subsequent equipping or removal of the cover hood, which usually is not possible with weight-balanced or -reduced covers or cover hoods. The connection can be produced without danger of breaking and provides in operation a favorable stress or permissible load. This type of connection further makes possible a non-overhanging and practically not visible attachment of the pivot parts.

An axially displaceable sleeve 9, 10, respectively, is arranged on the pivot axle 3 to the left and right of the holding part 5. Each of the sleeves 9, 10 is twist-proof, i.e., secured against rotation by means of a projection 11, 12, respectively, which projections are supported in the rear wall 1 of the bottom part 2 of the housing, and each of the sleeves 9, 10 is pressed against the holding part 5 by means of a helically formed compression spring 13, 14, respectively. The face surface 15, 16 of the sleeve 9, 10, respectively, which surfaces are directed toward the holding part 5, has a curved course or track 17, 18, respectively, which courses abut against a cam 19, 20 of the holding part 5, respectively, which cam in the case of a closed cover hood rests on a section of the curved course, the section lying in a radial plane relative and perpendicular to the pivot axle 3. In every other position of the cam 19, 20, where the curved course 17, 18 deviates from the radial plane, there arises a rotational moment on the holding part 5, under the influence of the compression springs 13, 14, the size of the rotational moment corresponding to the inclination of the curved course 17, 18, being exactly adjusted in every hood position to the moment produced by the weight of the cover hood. With a closed cover hood there arises no compensation moment, whereby every execution load on the hood is eliminated, no inclination or tendency to open exists by springing back, and the cover hood also without further, can be removed from the bottom part of the housing. In a relatively small transfer range, for example, 5° to 8°, the compensation moment rises to its full value corresponding to the weight of the cover hood, so that from then on the cover hood can be allowed to stay as is, in every chosen open position.

A knurled nut 21 is applied on the pivot axle 3. By twisting of the nut, the tension of the compression springs 13, 14 are adjusted which makes possible the use of cover hoods with different heights and weights, respectively.

While I have disclosed one embodiment of the invention, it is to be understood that this embodiment is given by example only and not in a limiting sense.

I claim:

1. In an apparatus housing comprising a bottom part and a cover hood, the improvement comprising
    a pivotal connection means between said bottom part and said cover hood for opening and closing, respectively, said cover hood by pivoting the latter about an axis extending parallel to a side of said bottom part, said means comprising
    at least one sleeve disposed concentrically to said pivot axis and axially displaceably, yet non-rotatably arranged relative to said bottom part on the latter,
    said at least one sleeve having a face side forming a curved course,
    a cam pivotally mounted about said pivot axis adjacent to said face side of said at least one sleeve, said cam being connected with said cover hood for joint rotation therewith,
    a compression spring operatively disposed pressing said axially displaceable sleeve with said curved course against said cam, and
    said curved course having an inclination relative to a radial plane through said at least one sleeve, said inclination and said compression spring being sized such that within a predetermined rotation range of said cam about said axis corresponding substantially to an opening movement of said cover hood, there is produced relative to said axis a rotational moment on said cam by said curved course of said sleeve pressing against said cam, which moment corresponds in every position within said rotation range substantially to a rotational moment produced by the gravity force on said cover hood, yet in an opposite rotational sense.

2. In the apparatus housing as set forth in claim 1, the improvement further wherein
    said curved course of said face side on said sleeve has a transfer portion in a radial plane relative to said axis, said transfer portion lying in a range of a position of said cam, which position corresponds to a closed position of said cover hood.

3. In the apparatus housing as set forth in claim 1, the improvement further comprising
    a holding part supported on said bottom part of said apparatus rotatably about said axis, said holding part holding said cam,
    said holding part being formed with a slot shaped, one sided accessible opening,
    said cover hood having an extension directed substantially perpendicularly downwardly provided on its bottom side, and
    said extension is insertable in said slot shaped opening on said holding part.

4. In the apparatus housing as set forth in claim 1, the improvement further wherein
    said at least one sleeve comprises two sleeves disposed on opposite sides of said cam, and
    two of said compression spring, respectively, disposed pressing said two sleeves, respectively, with said curved courses against said cam at opposite sides thereof.

* * * * *